A. E. COOK.
ENDLESS CUTTER FOR MOWERS.
APPLICATION FILED OCT. 30, 1917.
1,353,891. Patented Sept. 28, 1920.
5 SHEETS—SHEET 1.
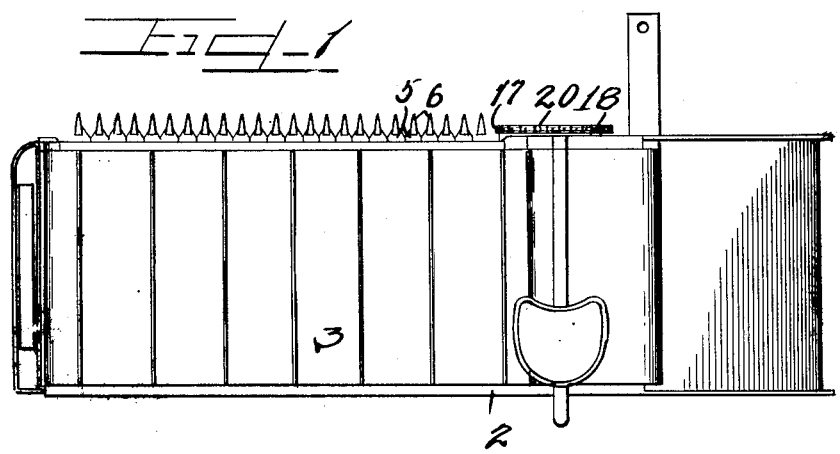
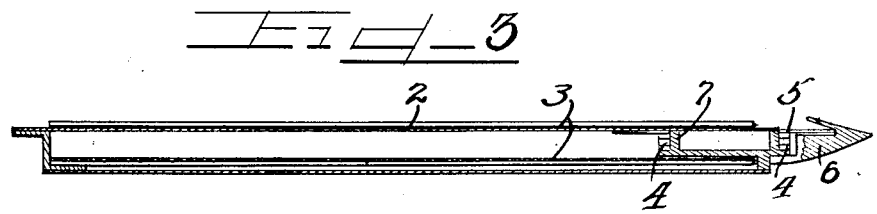
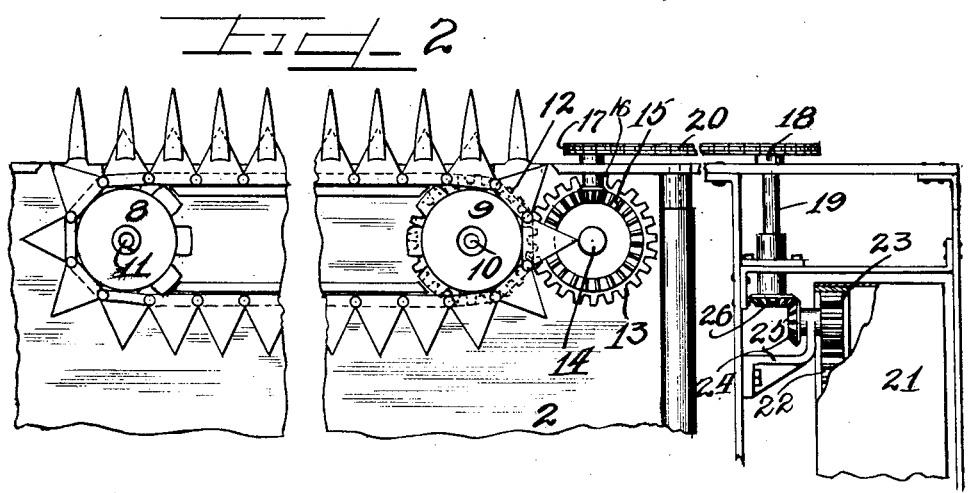
Witnesses
J. W. Angell
Charles Hill Jr.
Inventor
Albert E. Cook
By Charles Hill Atty.

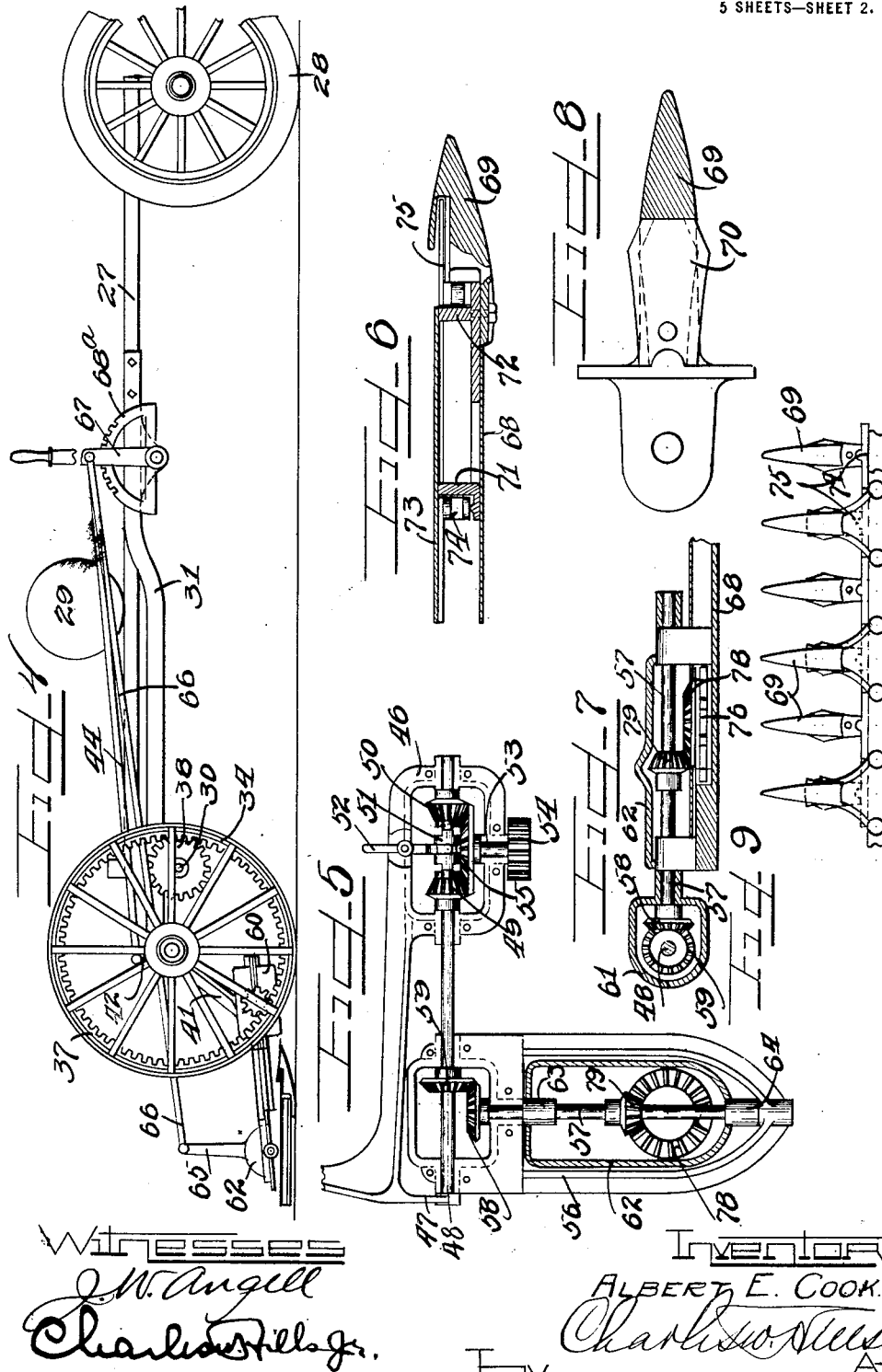

A. E. COOK.
ENDLESS CUTTER FOR MOWERS.
APPLICATION FILED OCT. 30, 1917.
1,353,891.
Patented Sept. 28, 1920.
5 SHEETS—SHEET 3.
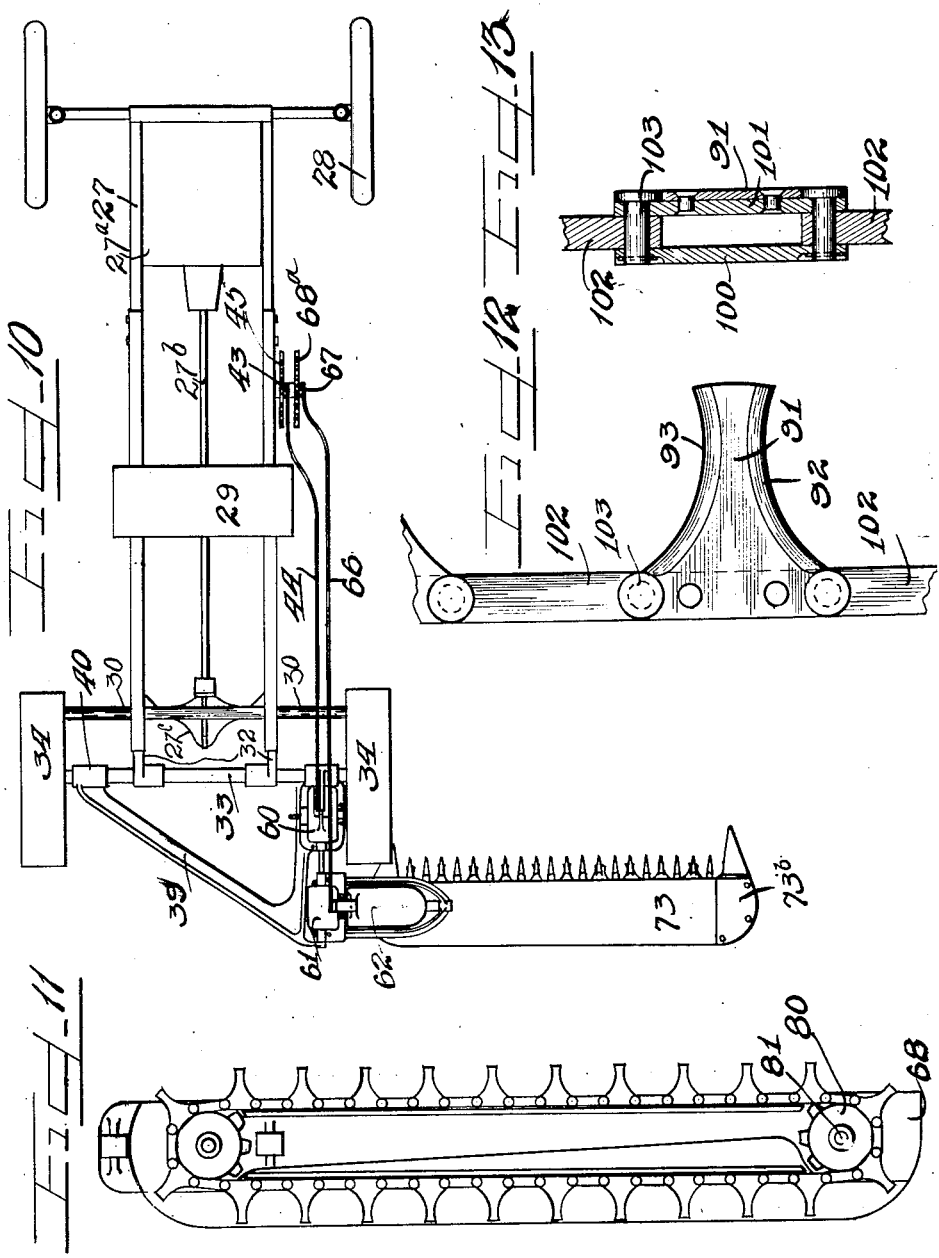

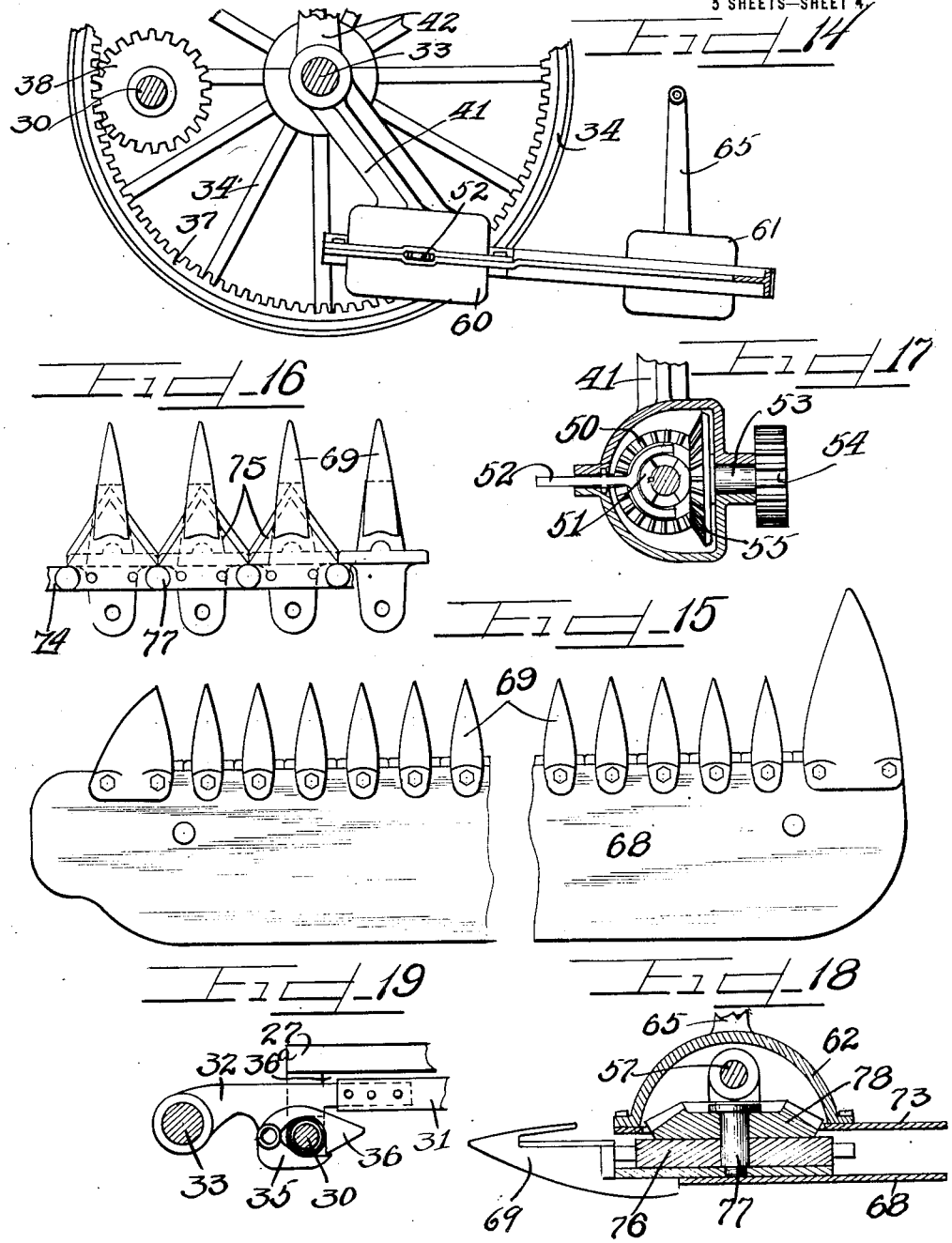

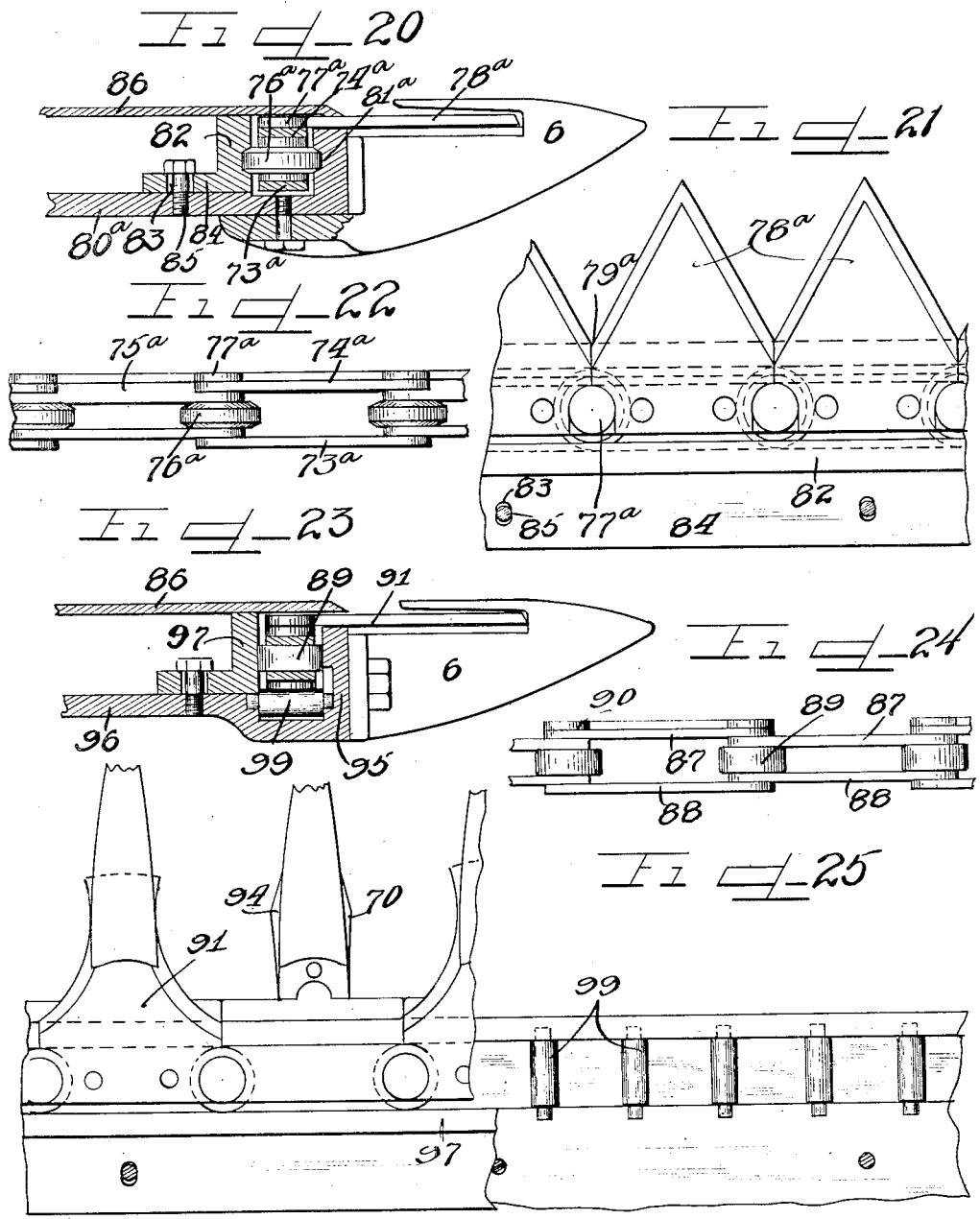

UNITED STATES PATENT OFFICE.

ALBERT E. COOK, OF EVANSTON, ILLINOIS.

ENDLESS CUTTER FOR MOWERS.

1,353,891.   Specification of Letters Patent.   Patented Sept. 28, 1920.

Application filed October 30, 1917. Serial No. 199,293.

*To all whom it may concern:*

Be it known that I, ALBERT E. COOK, a citizen of the United States, and a resident of the city of Evanston, in the county of Cook and State of Illinois, have invented certain new and useful Improvements in Endless Cutters for Mowers, of which the following is a full, clear, and exact description of the same, reference being had to the accompanying drawings, and to the numerals of reference marked thereon, which form a part of this specification.

Heretofore, in mowers, reapers, and grain harvesting machines, the sickle or cutter has had a reciprocating motion. With such action, the speed of operation is limited for at the end of each stroke, a distinct stop must be made prior to the next stroke. This distinct stop limits the speed at which the cutting mechanism may be operated, and therefore limits the rate at which the hay or grain may be cut. Reciprocating cutters also have the objection that if one edge of any one of the knives becomes broken or badly nicked from any cause, such as stones, dirt, nails or pieces of wood, it necessitates stoppage of the machine in order to replace the knife, as in all reciprocating cutting mechanisms, both sides of each knife are used for each rotation of the crank or wrist pin.

It is an object of my invention to provide a horizontal endless cutting mechanism for mowers and reapers whereby the grass, grain, corn, or cane is cut by knives continuously moving in one direction in cutting, thereby enabling the speed of the machine to be increased to cut a far greater amount in a given time than it is possible to cut with a machine using a reciprocating cutting mechanism.

It is further an object of my invention to provide a rotating cutting mechanism in which the cutter members may be constantly driven at a uniform speed, obviating the constant stoppage and starting of a reciprocating cutter, enabling a much faster cut being made and enabling the machine to travel much faster than heretofore, thereby permitting a larger quantity of material to be cut in a day.

It is further an object of my invention to provide a cutting mechanism in which the mechanism may be continuously driven in either direction to cut the material, adapting the cutters to operate in one direction until the knives are dull on one edge, after which, by simply reversing the direction of travel of the knives, all present the other sharp edge to the material. Thus should one edge of any knife be ruined, the cutting mechanism can still be operated by simply reversing the drive of the cutter.

It is further an object of my invention to provide a rotating cutting mechanism for reapers which may be readily installed in any of the reapers and harvesting machines now in use in lieu of the reciprocating cutting mechanisms.

It is further an object of my invention to provide a continuously traveling cutting mechanism and a roller bearing therefor to reduce friction to a minimum and increase the ease of operation, and reduce the wear.

It is further an object of my invention to provide a high speed cutting mechanism which may be attached as a unit to the chassis of any motor car by simply backing the chassis between and securing thereto a pair of shafts or bars forming part of the mower units.

It is further an object of my invention to provide novel cutting knives, any of which may be readily removed and a new one inserted, and to provide mechanism whereby the cutter bar and mechanism may be elevated or the pitch of the knives varied as the requirements demand.

Other and further important objects of this invention will be apparent to those skilled in the art from the disclosures in the drawings and specification.

The invention (in a preferred form) is illustrated in the drawings and hereinafter more fully described.

On the drawings:

Figure 1 is a top plan view of a binder with parts omitted, illustrating a cutting mechanism embodying my invention attached thereto in lieu of a reciprocating cutting mechanism.

Fig. 2 is a fragmentary top plan view with parts broken away and other parts omitted.

Fig. 3 is a section taken transversely through the platform, conveyer and cutting mechanism.

Fig. 4 is a view of a mower unit embodying my invention attached to the chassis of a converted automobile tractor.

Fig. 5 is a view of part of the driving mechanism for the cutters.

Fig. 6 is an enlarged transverse section taken through the cutting mechanism.

Fig. 7 is a view of the driving mechanism shown in Fig. 5, taken at right angles thereto.

Fig. 8 is a view of a single guard tooth in section at the outer end, showing the construction of one of the stationary knives.

Fig. 9 is a fragmentary top plan view of one form of cutting mechanism.

Fig. 10 is a top plan view of the mower unit attached to a chassis.

Fig. 11 is an enlarged view of the cutting mechanism shown in Fig. 10, with the cover plate and guards removed.

Fig. 12 is an enlarged detail of a knife shown in Fig. 11.

Fig. 13 is a fragmentary section taken longitudinally of the chain, illustrating one way for attaching the knives.

Fig. 14 is an enlarged fragmentary detail of the driving connections when operated from a converted tractor.

Fig. 15 is an enlarged bottom plan view of the cutter guard.

Fig. 16 is a fragmentary detail of another form of knife.

Fig. 17 is an enlarged sectional detail taken on Fig. 5, of a mechanism for reversing the drive of the cutters.

Fig. 18 is a sectional view of the drive for the cutting mechanism.

Fig. 19 is a detail illustrating the method of attachment the driving axle of the car to the cutting or harvesting unit.

Fig. 20 is a view showing one form of roller bearing for the cutter chain.

Fig. 21 is a top plan view of the mechanism shown in Fig. 20, illustrating a method of taking up the wear on the anti-friction bearings.

Fig. 22 is a fragmentary view of the cutter chain.

Fig. 23 is a modified form of anti-friction driving mechanism.

Fig. 24 is a fragmentary detail illustrating the chain shown in Fig. 23.

Fig. 25 is a fragmentary detail showing the anti-friction rollers in top plan.

As shown on the drawings:

The reference numeral 2 indicates the platform of a self-binding reaper, which platform is supplied with a cutting mechanism embodied in my invention. Inserted in the platform around which a canvas conveyer 3, is trained, is the horizontal rotary cutting mechanism which comprises an endless sprocket chain 4, to which is attached a plurality of cutters or knives 5, which travel in the guards 6, secured to the housing 7. Different forms of cutting mechanism will be hereinafter more fully described.

The sprocket chains are trained around sprocket wheels 8 and 9, secured to shafts 10 and 11, journaled in the housing 7. Secured on the shaft 10, is a gear 12, which meshes with a gear 13, on shaft 14, and a bevel gear 15, is also secured on shaft 14, which meshes with bevel pinion 16, on a stud shaft on the opposite end of which a sprocket wheel 17, is secured, around which and a sprocket wheel 18, on shaft 19, a drive chain 20, is trained. The shaft 19, is driven from the drive wheel 21, of the binder, by means of an internal gear 22, which meshes with a pinion 23, on a stud shaft journaled in bracket 24, and a bevel pinion 25, on the stud shaft, meshes with a bevel pinion 26, on shaft 19.

In Figs. 4 and 10, et cetera, a mowing or harvesting unit is shown attached to the chassis of an automobile. The chassis frame 27, front wheels 28, gasolene tank 29, power plant 27$^a$, drive shaft 27$^b$, differential 27$^c$, and differential shafts 30, of the chassis, are shown. The unit comprises shafts or frame members 31, which at the forward end are bolted or otherwise suitably secured to the side frame members 27, and at the rear ends, extensions 32, are bolted or suitably secured thereto, provided with bearings in which a shaft 33, is journaled, and on which the drive wheels 34, are suitably secured. The rear end of the supplemental frame members 31, and brackets 32, support the differential shafts 30, (the normal rear axle), of the car, by means of supporting clamps 35, and gravity levers 36, and arms 36$^a$, support the rear end of the chassis from the axle housing. The drive wheels 34, are provided with internal annular gears 37, which mesh with pinions 38, secured on the differential shafts 30, (in lieu of the normal rear automobile wheels) and the drive wheels 34, are driven from the motor plant of the car.

Journaled on the shaft 33, is a frame which carries the cutting mechanism. Said frame comprises an arm 39, provided with a bearing 40, journaled on shaft 33, near one end thereof, and an arm 41, journaled on the opposite end of the shaft adjacent the cutting mechanism. This arm 41, has a lever 42, integral therewith which extends upwardly above the axle, and is connected to a lever 43, by means of a rod 44. Said lever 43, has the usual spring detent to engage the toothed sector 45, by means of which said frame may be elevated or depressed which, of course, also gives corresponding adjustment to the cutting mechanism to raise it from the ground or to lower the same to travel closer to the ground or in any adjustment.

Integral with said frame is a frame member 46, in which and on an arm 47, extending therefrom, is journaled a drive shaft 48, on which, in the frame 46, are journaled opposed loose bevel pinions 49 and 50, either of which is adapted to be connected to drive the shaft 48, by means of the clutch member 51, operated by the lever 52. A stud shaft 53, is journaled in the frame member 46, and has a gear 54, on the outer end, which meshes with the annular gear 37, in the drive wheel 34, and a bevel gear 55, is secured on the inner end of the shaft 53, and meshes with both bevel pinions. It is obvious that by manipulation of the clutch, the drive shaft 48, can be rotated in either direction.

Pivoted on the drive shaft 48, is a bracket 56, provided with suitable bearings in which is journaled a shaft 57, provided on the inner end thereof with a bevel gear 58, which meshes with a bevel gear 59, on the drive shaft 48. Suitable housings 60 and 61, are provided for inclosing the gearing. Pivoted or journaled on the shaft 57, by means of bearings 63 and 64, is a housing 62, and to this housing the cutting mechanism is attached, or if preferred, the cutting mechanism may be pivoted directly to said shaft. A lever 65, is secured to the top of the housing to which a rod 66, is connected, which in turn is connected to a lever 67, which engages the gear segment 68$^a$. By means of this lever 67, the pitch or tilt of the cutter can be controlled. The specific construction of the rotating cutting mechanism may vary through a wide range, and for the purpose of illustration, two different styles have been shown. In each instance, a guard bar 68, is either journaled to shaft 57 or secured to housing 62, in any manner so as to swing with the housing to vary the pitch of the teeth. Secured to the guard bar 68, are guard teeth 69, of a well known construction, and secured to the guards are the stationary knives or ledger plates 70. Secured to the cutter bar 68, are spacing members or tracks 71 and 72, to which is secured the cover plate 73, for the cutting mechanism.

The cutting mechanism comprises an endless chain 74, constructed of suitable links to which are riveted the knives 75. The chain cutting mechanism is driven by means of a sprocket 76, on a stud shaft 77, (see Fig. 18) on which is secured a bevel gear 78, meshing with a pinion 79, on shaft 57. The outer bight of the sprocket chain 74 is trained around a sprocket wheel 80 on shaft 81, secured to the outer end of the guard bar 68, and the chain is spaced apart by the ways 71 and 72.

The description of the different rotary cutting mechanisms will now be given. In the construction shown in Figs. 20, 21 and 22, a sprocket chain is provided comprising links 73$^a$, 74$^a$ and 75$^a$, of which the links 75$^a$, are of double thickness so that the upper face of the chain lies in the same plane. These links are secured together by pintle bolts on which, between the links, are placed anti-friction rollers 76$^a$, and each pintle has an enlarged circular head 77$^a$. Riveted on the upper links are knives 78$^a$, which are triangular in shape having abutting edges 79$^a$, and cut away at the rear to provide notches to engage the head 77$^a$, of the pintles. Guard teeth 6 are provided as before described, which are attached to the guard bar 80$^a$, having its outer end upturned at 81$^a$, forming a race member, and an adjustable race member 82, is adjustably attached to the guard 80$^a$, by having a slot 83, in the flange 84, thereof, through which a bolt 85, extends and is threaded into the guard bar. Grooves are provided in said race members 81$^a$ and 82, in which the guide rollers 76$^a$, engage, and a cover plate 86, is provided for retaining the mechanism in place and preventing dirt from getting into the same.

In the construction shown in Figs. 23, 24 and 25, the rotary cutting mechanism comprises a chain consisting of links 87 and 88, connected together at the ends by a pintle bolt on which a guide roller 89, is journaled. These pintle bolts also have a circular head 90, and cutter knives 91, are secured to alternate links by rivets, and the corners of the knives are notched as before described to receive the heads of the pintle bolts therein. The knives, as shown more clearly in Fig. 12, are provided with opposite concave cutting edges 92 and 93, and the stationary knives or plates 70, (see Fig. 8) are provided with opposite cutting edges, each of which is angular in shape, the angle 94, of which, is at the point of greatest concavity of the knives, thereby adapting the knives to make a clean shear cut. The guards 6, are secured to the upturned flange 95, of the guard bar 96, and an adjustable race member 97, is provided between which and the flange 95, the rollers 89, engage. Also secured in a channel in the guard bar, are anti-friction rollers 99, on which the sprocket chain is supported to reduce the wear caused by drag of the chain thereover.

In the construction shown in Figs. 11, 12 and 13, a rotating cutting mechanism is provided which is rotated at a very high velocity so that the cut is made without use of the guards and stationary cutting knives. In this instance, links 100 and 101, are provided, which are attached to alternate links 102, and pintles 103, pivotally connect the ends of the links. The knives 91, are secured to alternate links 101. In these figures, the guard teeth are omitted.

The operation is as follows:

In either instance, whether the cutting mechanism is used in a mower or for cutting grain, corn, or cane, the cutting mechanism is driven at a high velocity to cut the material. The cutting mechanism may be installed in present machines now in use, if desired, by removing the reciprocating cutting mechanism and installing my endless cutting mechanism in lieu thereof. The machine may be quickly attached to any chassis by backing the chassis between the frame members 31, and attaching the mowing unit to the chassis frame. Of course, the frame members 31, may be constructed to be attached to any suitable source of draft.

In whatsoever manner the machine is pulled, it will be observed that the cutting mechanism is rotated at a constant speed, eliminating the stop which occurs in reciprocating mechanisms at the end of each stroke, adapting the machine being advanced at a much greater speed over the ground, as the cutting mechanism continuously rotating is driven at a speed to cut the material corresponding with the rate of forward travel. Should one side of the cutter knives become dull or broken, the clutch 51, may be shifted to reverse the rotation in which the opposite edges of the knives are utilized in cutting.

If desired, instead of the usual type of differential, a differential may be used in which the drive is delivered to the wheel offering the greatest desistance, such as the Bailey non-stall differential. This is especially advantageous where the lighter loaded wheel is inclined to slip in muddy or slippery ground which compels the heavier loaded wheel being actuated to effect the drive.

By removing the cover plates 86 and 73, the cutting mechanism may be removed so that the knives may be sharpened or, if preferred, the end 73$^b$, of the cover plate 73, (see Fig. 10), may be removed and the knives sharpened without taking the cutting mechanism from the machine. Operation of lever 67, swings the guard bar and cutting mechanism to vary the pitch of the cutting, and operation of lever 43, serves to control the raising and lowering of the mechanism from the ground. Also, the cutting mechanism as a whole may be elevated to the vertical position by pivoting the same on shaft 48, and any suitable rod or means may be used to hold the same in this position.

Details of construction may be varied through a wide range and numerous changes may be made, and I therefore purpose claiming broadly a horizontal endless cutting mechanism. I therefore do not purpose limiting the claims otherwise than necessitated by the prior art.

I claim as my invention:

1. In a device of the class described, a guard bar, guard teeth secured thereto, race members secured to the guard bar, one of said race members being adjustable, an endless chain between said race members, rollers forming a part of said chain and engaging said race members, and knives secured to the chain adapted to travel through the guard teeth.

2. A mower cutting mechanism comprising an adjustable guard bar, a flange integrally formed thereon, an endless cutter on said guard bar, and an adjustable race member on said guard bar adapted to co-act with said flange to afford a guide for said endless cutter.

3. A cutting device comprising a support, means for adjusting the same, an endless cutter, driving means therefor, adjustable means on said support affording a race for the endless cutter, guide rollers forming a part of the endless cutter engaged in said race, and rollers mounted on said support for supporting the endless cutter to obviate friction.

4. A cutting device comprising a support, means for adjusting the same, a flange integrally formed on said support, a race member adjustably mounted on said support to co-act with said flange to afford a guide race, an endless chain disposed to move in said guide race, cutting blades on said chain, rollers on said chain adapted to track between said flange and said adjustable race member, means for driving the chain, and rollers on said support for supporting the endless chain.

In testimony whereof I have hereunto subscribed my name in the presence of two subscribing witnesses.

ALBERT E. COOK.

Witnesses:
EARL M. HARDINE,
CHARLES W. HILLS, Jr.